United States Patent [19]
Philo et al.

[11] Patent Number: 5,263,535
[45] Date of Patent: Nov. 23, 1993

[54] EVAPORATOR COIL MOUNTING DEVICE

[75] Inventors: Max D. Philo, Greenville; Bonnie V. Cannon, Ionia, both of Mich.

[73] Assignee: White Consolidated Industries, Inc., Cleveland, Ohio

[21] Appl. No.: 898,554

[22] Filed: Jun. 15, 1992

[51] Int. Cl.$^5$ .............................. F28F 9/00; F16L 3/00
[52] U.S. Cl. ........................................ 165/67; 62/466; 248/73; 312/408
[58] Field of Search .................... 165/67, 178; 62/295, 62/466, 515; 312/408; 248/68.1, 73

[56] References Cited

U.S. PATENT DOCUMENTS

| | | | |
|---|---|---|---|
| 647,945 | 4/1900 | Cope | 248/73 |
| 1,802,964 | 4/1931 | Brady | 248/73 |
| 2,098,198 | 11/1937 | Sindelar | 312/408 |
| 2,522,465 | 9/1950 | Romito | 312/408 |
| 2,647,812 | 8/1953 | Saunders | 312/408 |
| 2,654,231 | 10/1953 | Eichhorn | 62/466 |
| 2,955,438 | 10/1960 | Thompson | 62/298 |
| 3,180,606 | 4/1965 | Sabin et al. | 248/73 |
| 3,354,948 | 11/1967 | Round et al. | 165/67 |
| 3,378,064 | 4/1968 | Benkert | 165/67 |
| 3,844,515 | 10/1974 | Knol | 248/71 |
| 4,078,396 | 3/1978 | Penizotto et al. | 62/298 |
| 4,330,030 | 5/1982 | Cate | 165/67 |
| 4,338,994 | 7/1982 | Hewing et al. | 165/49 |
| 4,380,263 | 4/1983 | Wright | 165/76 |
| 4,522,157 | 6/1985 | O'Sullivan et al. | 122/510 |
| 4,674,910 | 6/1987 | Hayashi | 248/73 |
| 4,709,556 | 12/1987 | Hupfer | 62/298 |
| 4,995,245 | 2/1991 | Chang | 62/515 |

Primary Examiner—John Rivell
Assistant Examiner—L. R. Leo
Attorney, Agent, or Firm—Pearne, Gordon, McCoy & Granger

[57] ABSTRACT

An evaporator coil mounting pin which is operable to retain the evaporator coil adjacent the rear interior cabinet wall of the refrigerator cabinet to prevent the evaporator coil from accidentally slipping off the mounting pin during assembly of the refrigerator. The mounting pin provides both vertical and horizontal support for the evaporator coil, and includes a refrigerator cabinet engaging portion which extends into the refrigerator cabinet and positively locks the mounting pin in place. The mounting pin further includes a stop, a disc-shaped baseplate and an upstanding shoulder, the upstanding shoulder extending between the stop and the baseplate along a portion of the length of the mounting pin. The evaporator coil is supported by the upstanding shoulder and is positioned between the stop and the refrigerator cabinet, and is thus prevented from being unintentionally displaced from the mounting pin. The terminal end of the mounting pin provides a support surface with a fastener receiving aperture formed therein for mounting of the evaporator cover, which forms the rear surface of the food storage compartment. Self threading screws or other appropriate fasteners are used to attach the evaporator cover to the mounting pin.

14 Claims, 3 Drawing Sheets

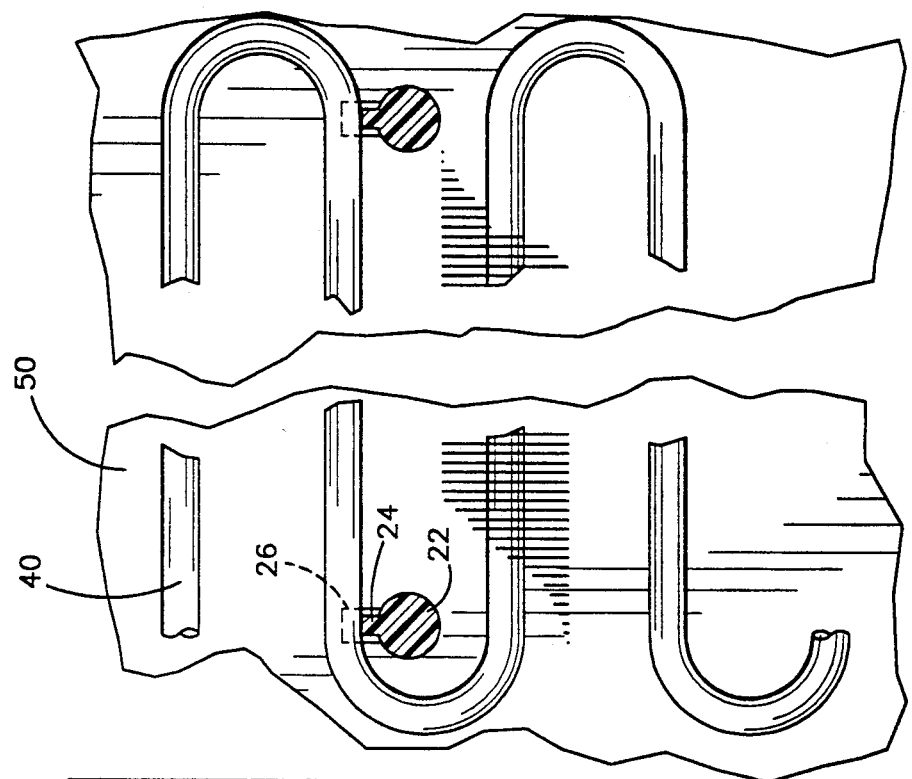
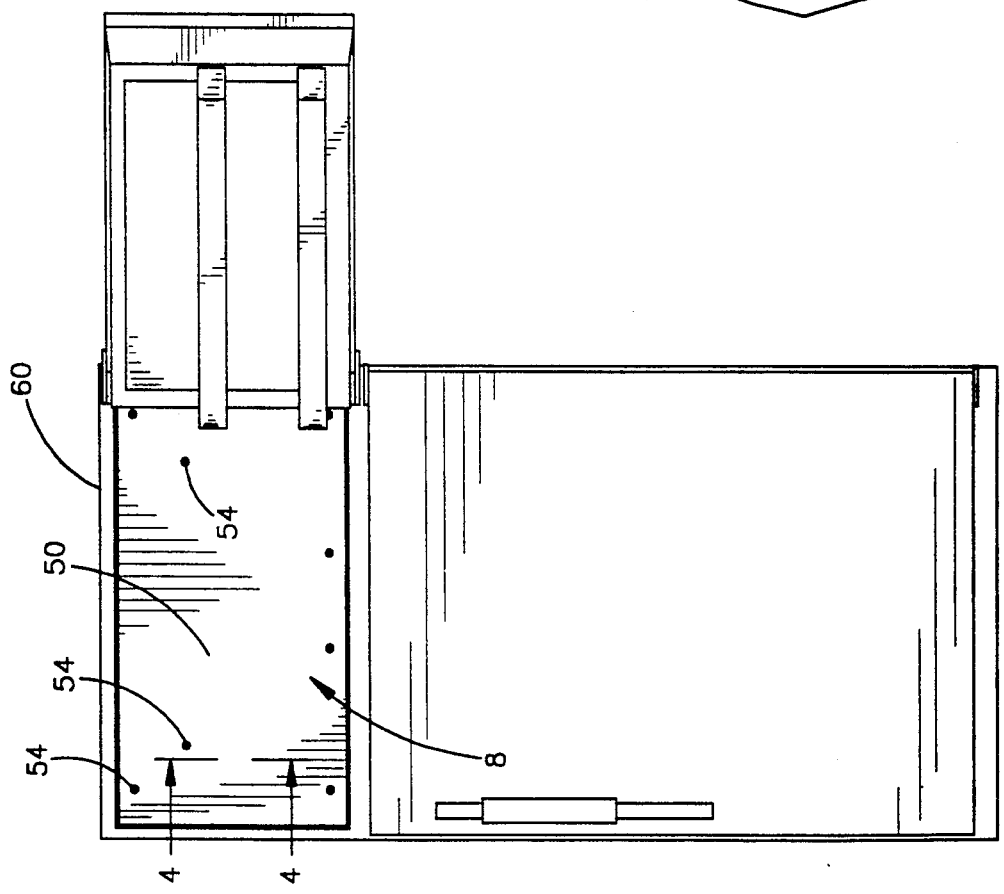
Fig.5
Fig.1

EVAPORATOR COIL MOUNTING DEVICE

BACKGROUND OF THE INVENTION

1. Field of the Invention

The present invention relates generally to mounting devices, and more particularly to a device for mounting an evaporator coil within a refrigerator cabinet.

2. Description of the Related Art

During the assembly of refrigerators, it is necessary to mount the evaporator coil to the rear interior surface of the refrigerator cabinet. It is further necessary to provide mounting surfaces upon which are mounted the evaporator cover. The evaporator cover separates the evaporator from the food storage compartment of the refrigerator and serves as the back wall of the food storage compartment.

Evaporator mounting pins have been developed which facilitate mounting of the evaporator coil and the evaporator cover. These known mounting pins have a cabinet engaging member and a cylindrical outwardly extending member which is positioned to engage the evaporator coil generally at a U-shaped portion of the coil. The terminal end of the cylindrical member is adapted to receive a screw or similar fastening device to enable mounting of the evaporator cover thereto.

During assembly of the refrigerator, the mounting pins are initially installed in the refrigerator and the evaporator coil is thereafter positioned over the outwardly extending portion of the mounting pins. The mounting pins provide vertical support for the evaporator coil. With the evaporator coil thus supported, the necessary connections to the evaporator coil are made and additional accessories are mounted on the evaporator.

Since the mounting pins do not prevent the evaporator coil from moving horizontally, it is not uncommon for the evaporator coil to slide off the mounting pins and hang unsupported within the refrigerator cabinet during the assembly process. This often causes damage to the interior of the refrigerator cabinet as well as to the evaporator and other components within the refrigerator and results in reduced production speed, efficiency, and quality.

SUMMARY OF THE INVENTION

The present invention has been developed in response to the need to more firmly mount and positively retain the evaporator coil within the refrigerator during assembly.

A primary object of the present invention is to provide an evaporator mounting pin which supports the evaporator coil against both vertical and horizontal movement. In keeping with the primary object of the present invention, the evaporator coil mounting pin provides a refrigerator engaging portion and a generally cylindrical outwardly extending portion. The outwardly extending portion provides a stop means which is operable to prevent movement of the evaporator coil along the length of the outwardly extending portion of the mounting pin. The stop means is positioned such that the evaporator coil is located between the stop means and the refrigerator cabinet to prevent the evaporator coil from falling off the mounting pin.

Another object of the present invention is to provide an evaporator mounting pin which facilitates the mounting of the evaporator coil thereon while preventing the unintentional removal of the coil therefrom.

BRIEF DESCRIPTION OF THE DRAWINGS

These and further objects of the invention will be apparent with reference to the description and drawing figures wherein:

FIG. 1 is a perspective view of a refrigerator cabinet with the upper door open;

DETAILED DESCRIPTION OF THE PREFERRED EMBODIMENT

Figure 2:
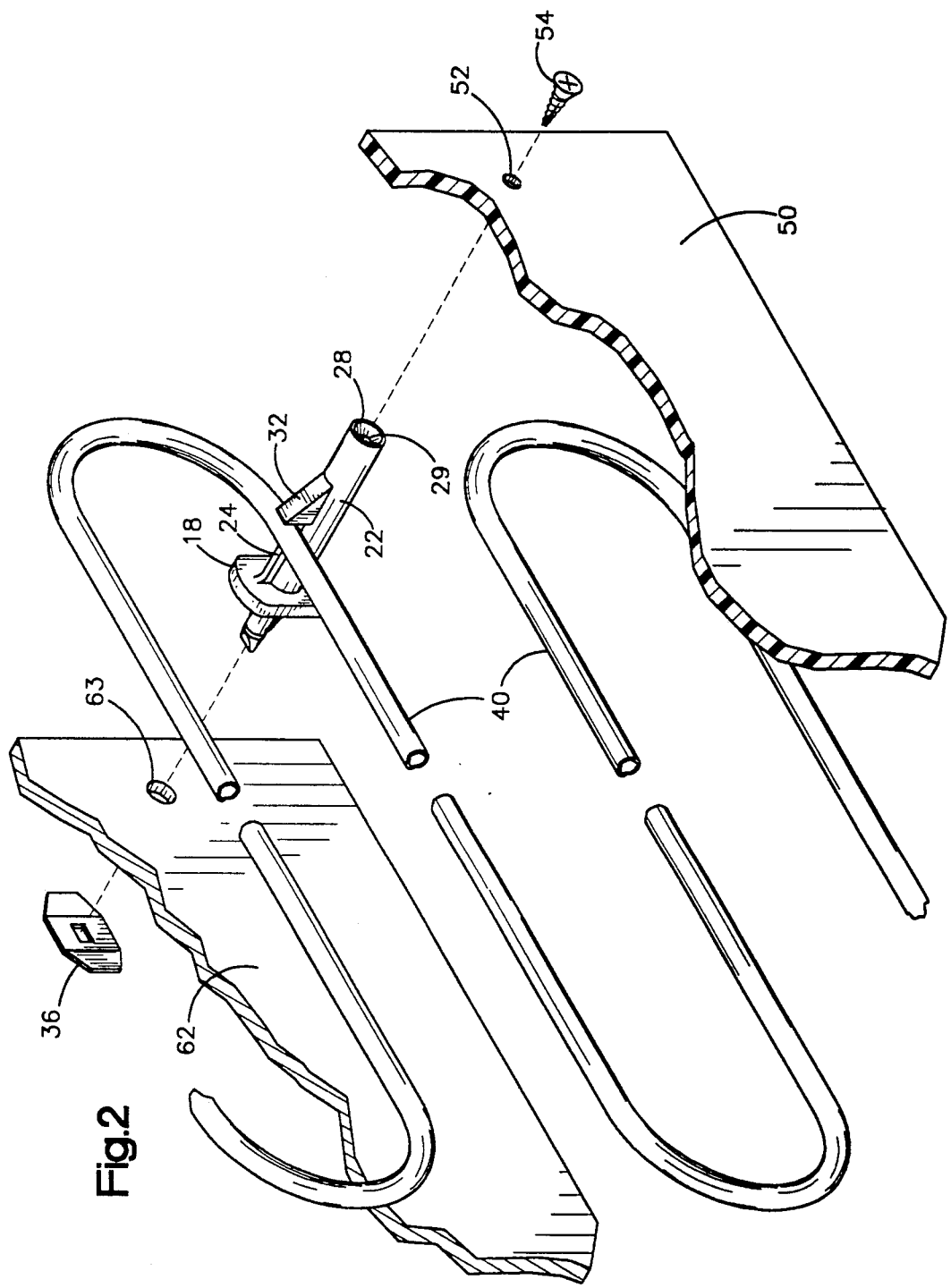
FIG. 2 is an exploded perspective view of the evaporator coil, mounting pin and evaporator cover of the present invention.

With reference to the drawing figures, the present invention is directed towards a novel mounting pin 10 which securely attaches an evaporator coil 40 to an interior rear surface 62 of a refrigerator cabinet 60 and which provides a mounting surface 28 for an evaporator cover 50. The evaporator coil 40, in an over-under style refrigerator, is typically mounted behind the upper food storage compartment 8. The evaporator coil 40 is normally covered by the evaporator cover 50, which also serves as the rear wall of the upper food storage compartment 8. As shown in FIG. 1, the evaporator cover 50 is mounted at the rear of the upper food storage compartment 8 by means of fastening devices 54, at least some of which are attached to the evaporator coil mounting pins 10 as will be described hereafter.

Figure 3:
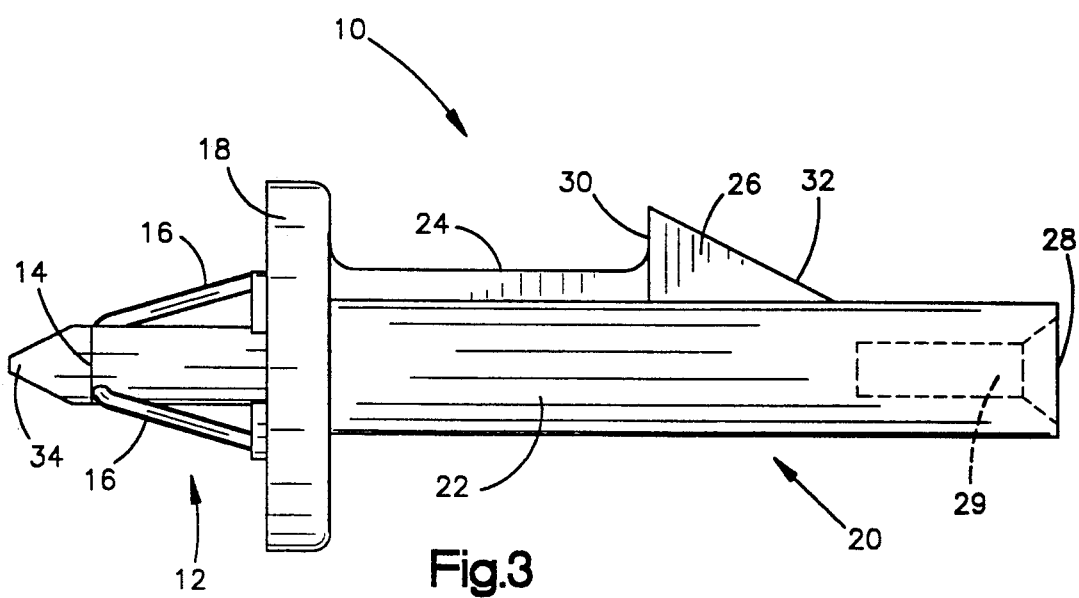
FIG. 3 is a side elevational view of the mounting pin of the present invention.
Figure 4:
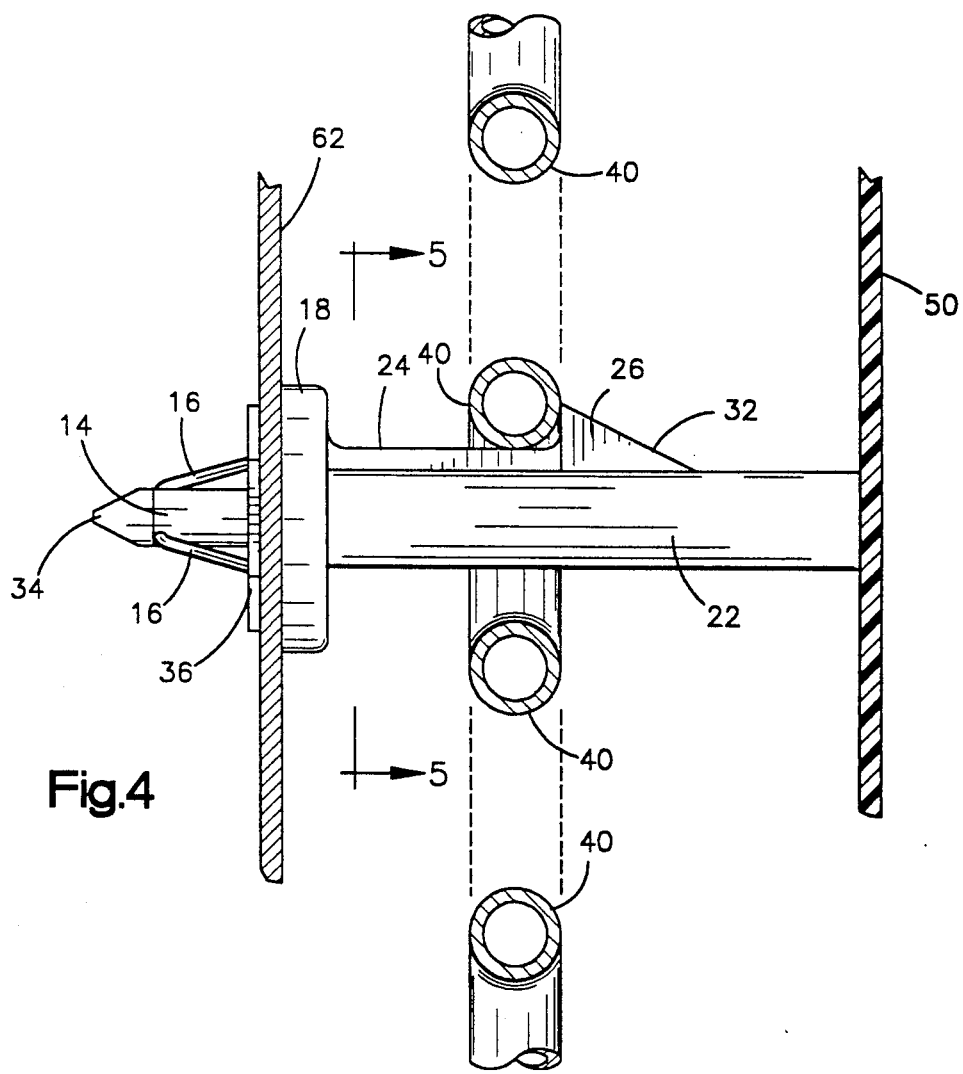
FIG. 4 is a sectional view of the evaporator coil mounting pin taken along line 4—4 in FIG. 1; and, FIG. 5 is a sectional elevational view of the evaporator coil mounted to the refrigerator cabinet taken along line 5—5 in FIG. 4.

As shown in FIGS. 3 and 4, the mounting pin 10 provides a cabinet engaging portion 12 which includes a generally cylindrical portion 14 and a pair of metal tabs 16. Adjacent the cabinet engaging portion 12, the mounting pin 10 is provided with a generally disc-shaped baseplate 18. When the cabinet engaging portion 12 is installed within the cabinet 60, the pair of metal tabs 16 are operable to prevent removal of the mounting pin 10 therefrom, while the baseplate 18 acts as a depth determining means, limiting the penetration of the mounting pin into the cabinet to a predetermined amount.

The mounting pin 10 further provides a generally cylindrical outwardly extending portion 20 which includes a cylindrical central body member 22, an upstanding shoulder portion 24, and a stop means 26. A terminal end 28 of the central body member 22 is adapted to receive the fastening devices 54 to facilitate the mounting of the evaporator cover 50, as shown in FIG. 2.

The stop means includes a planar front face 30 and an upper ramp surface 32. The upstanding shoulder portion 24 extends between the planar front face 30 of the stop means 26 and the baseplate 18. When in use, as will be described hereafter, the evaporator coil 40 is positioned on the upstanding shoulder portion 24 between the planar front face 30 of the stop means 26 and the baseplate 18.

The mounting pin 10 is attached to the refrigerator cabinet in the following manner. A terminal end 34 of the cabinet engaging portion 12 is inserted into a predrilled hole 63 in the rear interior refrigerator surface 62. A metal backing plate 36, which was previously installed on the opposite side of the rear interior surface 62 of the refrigerator cabinet 60, is provided to engagingly receive the mounting pin. The cabinet engaging portion 12 of the mounting pin 10 is pushed through the hole 63 and through an opening in the backing plate 36, until the baseplate 18 engages the rear interior surface 62. The engagement of the baseplate 18 with the rear interior surface 62 operates as a depth determining means, indicating that the mounting pin 10 has penetrated the cabinet 60 a desired or predetermined amount.

With the mounting pin thus initially deployed, the pin 10 is then rotated about its longitudinal axis. This rotation causes the metal tabs 16 to engage the metal backing plate 36 carried by the refrigerator cabinet 60, deforming the tabs 16 and positively locking the mounting pin 10 within the refrigerator cabinet 60, as is well known in the art. Rotation of the mounting pin 10, in addition to locking the mounting pin 10 within the cabinet 60, also orients the upstanding shoulder portion 24 and stop means 26 in a generally vertical direction.

Naturally, there are several means of installing the mounting pin 10 within the refrigerator that are within the scope of the present invention as defined by the claims appended hereto. Therefore, the foregoing description of installation means is not to be interpreted in a limitative manner, but rather is included to illustrate the preferred embodiment of the present invention as presently contemplated by the applicant.

With the desired number of mounting pins 10 thus installed within the refrigerator cabinet 60, the mounting pins are ready to receive and support the evaporator coil 40. The evaporator coil 40 is initially positioned within the refrigerator compartment such that the underside of portions of the evaporator coil are in sliding contact with the mounting pins 10 near the terminal end 28 of the outwardly extending portion 20. With the evaporator coil 40 so positioned, inwardly directed force is applied to the evaporator coil 40 causing it to slide along the mounting pins 10 towards the stop means 26. The evaporator coil 40 is cammed upwardly upon the upper ramp surface 32 provided by the stop mean 26 and falls into place between the planar front face 30 of the stop means 26 and the rear interior surface 62 due, at least in part, to the force of gravity. Positioning the evaporator coil 40 between the stop surface 26 and the baseplate 18 adjacent the rear interior surface 62 of the cabinet 60, substantially reduces the ability of the evaporator coil 40 to move horizontally away from surface 62 during assembly of the refrigerator.

The evaporator coil 40 is thus prevented from falling off the mounting pins 10 by the stop means 26. However, limited horizontal movement for the coil 40 is possible along the upstanding shoulder 24 intermediate the baseplate 18 and the front face 30 of the stop means 26. This limited amount of horizontal motion is desirable to allow for external connections to the evaporator coil 40 as well as the mounting of various accessories.

At an appropriate later point in the assembly of the refrigerator, the evaporator mounting cover 50 is installed within the food storage compartment of the refrigerator. The evaporator cover 50, with preformed holes 52 which align with the holes 29 in the terminal ends 28 of the mounting pins 10, is placed against the evaporator mounting pins 10. Self tapping screws or other appropriate fastening devices 54 are thereafter used to secure the cover to the mounting pins 10.

While a preferred embodiment of the present invention has been illustrated, it should be understood that various modifications and rearrangements of parts may be resorted to without departing from the scope of the invention as defined by the claims appended hereto. For example, the upstanding shoulder described in the preferred embodiment of the present invention could be eliminated by enlarging the diameter of the central body member. Alternatively, the mounting locations of the mounting pins could be moved relatively upward, and the shoulder portion eliminated while keeping the diameter of the central body member generally the same. Also, the stop means of the present invention can be in any shape suitable to retain the evaporator coil. The shape depicted and described is preferred because it provides a camming surface 32 which aids in the assembly process. However, it is clear that the camming surface could be eliminated and the evaporator coil could merely be lifted into place between the stop means and the refrigerator cabinet. Therefore, it should be clear that the foregoing description is merely illustrative of the preferred embodiment, the scope of the invention being defined by the claims appended hereto.

What is claimed is:

1. A device for mounting an evaporator coil to a refrigerator cabinet, comprising:
    a refrigerator cabinet engaging portion, said refrigerator cabinet engaging portion being adapted to extend through a surface of the refrigerator cabinet; and
    an evaporator coil supporting portion, said evaporator coil supporting portion including stop means and being adapted to receive an evaporator coil between said stop means and the refrigerator cabinet surface, said stop means providing a generally planar front face and an upper ramped surface, said upper ramped surface defining a camming surface operable to encourage the placement of said evaporator coil between said planar front face and said refrigerator cabinet surface.

2. A mounting device according to claim 1, wherein said refrigerator cabinet engaging portion includes a locking means.

3. A mounting device according to claim 1, wherein said device includes a depth determining means, said depth determining means being operable to determine when said refrigerator engaging portion has been inserted into the refrigerator cabinet a predetermined amount.

4. A mounting device according to claim 3, wherein said depth determining means comprises a baseplate, said baseplate being located intermediate the refrigerator engaging portion and the evaporator coil supporting portion.

5. A mounting device according to claim 4, wherein said refrigerator engaging portion includes a locking means.

6. A mounting device according to claim 1, including an evaporator cover mounting portion, wherein said evaporator cover mounting portion comprises a terminal portion of said evaporator coil supporting portion, said terminal portion providing fastener receiving means to allow attachment of an evaporator cover thereto.

7. A device for mounting an evaporator coil to a refrigerator cabinet, comprising:

a refrigerator cabinet engaging portion, said refrigerator cabinet engaging portion being adapted to extend through a surface of the refrigerator cabinet; and an evaporator coil supporting portion, said evaporator coil supporting portion including stop means and being adapted to receive an evaporator coil between said stop means and the refrigerator cabinet surface, wherein said evaporator coil supporting portion includes an upstanding shoulder portion, said upstanding shoulder portion being located intermediate said stop means and a baseplate and providing a support surface for said evaporator coil, said evaporator coil having a limited range of horizontal motion along said shoulder portion.

8. A mounting device according to claim 7, wherein said refrigerator engaging portion includes a locking means.

9. A mounting device according to claim 7, wherein said stop means provides a generally planar front face and an upper ramped surface, said upper ramped surface defining a camming surface operable to encourage the placement of said evaporator coil between said planar front face and said refrigerator cabinet surface.

10. A mounting device according to claim 7, wherein said device includes a depth determining means, said depth determining means being operable to determine when said refrigerator engaging portion has been inserted into the refrigerator cabinet a predetermined amount.

11. A mounting device according to claim 10, wherein said depth determining means includes the baseplate, said baseplate being located intermediate the refrigerator engaging portion and the evaporator coil supporting portion.

12. A mounting device according to claim 11, including an evaporator cover mounting portion, wherein said evaporator cover mounting portion comprises a terminal portion of said evaporator coil supporting portion, said terminal portion providing fastener receiving means to allow attachment of an evaporator cover thereto.

13. A method for mounting an evaporator coil to a refrigerator cabinet, comprising the steps of:
(a) installing a mounting device within said refrigerator by inserting a terminal end of said mounting device through an interior wall of said refrigerator;
(b) sliding the evaporator coil onto the mounting device;
(c) camming the evaporator coil on a camming surface; and,
(d) sliding said evaporator coil over said camming surface and into a space between said refrigerator cabinet and a stop means on said mounting device, said evaporator coil having a limited range of horizontal motion between said refrigerator cabinet and said stop means to allow further assembly of said refrigerator cabinet while positively retaining said evaporator coil on said mounting device.

14. A mounting method according to claim 13, wherein the step of installing a mounting device within said refrigerator further comprises the steps of:
(a) inserting the terminal end of said mounting device through the interior surface of said refrigerator until a baseplate contacts said refrigerator; and,
(b) locking said mounting device in place.

* * * * *